June 1, 1937.  C. W. McGINNIS  2,082,253
ANTISKID CHAIN
Filed April 21, 1936
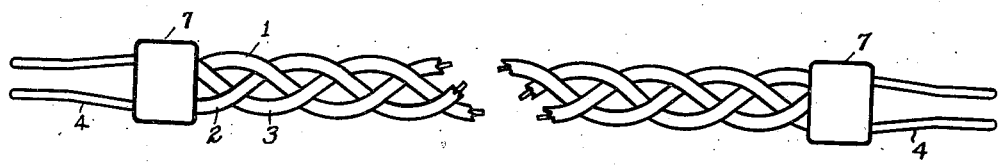
Fig. I.
Fig. II.
Fig. III.
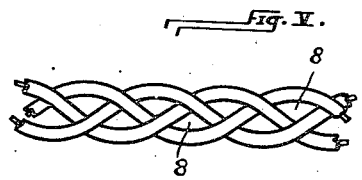
Fig. V.
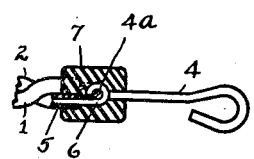
Fig. IV.
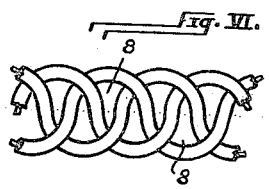
Fig. VI.
INVENTOR
Charles W. McGinnis
BY Christy and Wharton
ATTORNEYS Patented June 1, 1937

2,082,253

UNITED STATES PATENT OFFICE 2,082,253

ANTISKID CHAIN

Charles W. McGinnis, Pittsburgh, Pa.

Application April 21, 1936, Serial No. 75,559

2 Claims. (Cl. 152—14)

My invention relates to anti-skid chains for automobiles, and more particularly to cross-links for use in such chains.

As is generally known, an anti-skid chain consists of a plurality of links or bands adapted to be secured, by means of two side chains, across the tread of a tire. The cross-links or bands are spaced-apart circumferentially of the tire, and serve to increase traction on slippery roadways. Cross-links composed of metal chains have been used for years to such end, but they have been found objectionable for two reasons. First, they are noisy; and, second, they wear rapidly and require frequent replacement. Cross-bands of rubber, reenforced with metal or fabric, have been used to overcome these objections, and, while it appears that such rubber cross-bands are noiseless and out-wear those made of metal chain, it also appears that, if the rubber bands are smooth faced, they are of low anti-skid value. That is to say, they operate on wet or icy pavements only slightly better than the bare tread of the tire. In further refinement, the rubber cross-bands were made perforate, or were recessed within their effective faces. It was found that, by virtue of the perforations or recesses in the rubber, the desired traction on wet pavements was obtained. In winter driving, however, the perforations or recesses became filled and frozen over with snow and ice, in such manner that the cross-bands lost their value.

The object of my invention is to provide a perforate rubber cross-band which in service is adapted automatically to keep its perforations free from accumulations of snow, ice, and dirt. The invention embraces the discovery that a plurality of individually reenforced rubber strands, plaited in the form of a relatively flat band, provides an anti-skid cross-link of the above-mentioned character, and additionally provides a band affording improved traction and possessing greater durability.

In the accompanying drawing an embodiment of the invention is illustrated in exemplary way. Fig. I is a fragmentary view in plan of a cross-link for use in the usual anti-skid chain, or in the so-called emergency chains widely used at the present time. Fig. II is a fragmentary view in side elevation of the cross-link. Fig. III is a perspective view, showing to larger scale the material of which the cross-link is constructed. Fig. IV is a fragmentary, sectional view, taken on the plane IV—IV of Fig. I. Fig. V is a fragmentary view in plan of the plaited body of the cross-link, and Fig. VI is a similar view, illustrating to exaggerated degree the relative movement that occurs between the elements of the link in service.

Referring to the drawing, my cross-link is made of a plurality of flexible strands 1, 2, and 3, braided or plaited into an open-work band. The band is relatively flat; it is relatively wide with respect to its depth, as may be seen by comparing Figs. I and II; it is provided with links 4 at its opposite ends for attachment to the usual side members of a tire-chain (not shown), in such manner that the band extends across and lies substantially flat upon the tread of the tire to which it is applied. The links 4 are merely illustrative of the fastening means which may be applied.

As shown in Fig. III, the strands 1, 2, and 3 are individually formed before braiding, in the form of an elongate (and in this case a smooth-faced and cylindrical) body 5 of rubber, reenforced with a metal core 6. The core 6 may comprise a single wire of relatively soft, flexible steel, or other suitable metal of relatively great tensile strength and flexibility, or it may comprise a composite wire of twisted strands. And the body 5 of rubber is applied, and, advantageously, is vulcanized, to the core by processes known to the rubber art. The formed strand 5, 6 may be cut into desired lengths and then plaited into the form of the band 1, 2, 3, or three continuous strands 5, 6 may be plaited into a continuous band, which is cut into lengths to provide the bands 1, 2, 3.

The fastening devices 4 are U-shaped in plan as indicated in Fig. I, and, as indicated in Fig. IV, the terminals of the cores 6 of the several strands 1, 2, and 3 are bared and coiled around the base 4a of the U. Then a keeper in the form of an enveloping body 7 of relatively hard rubber is vulcanized over the assembly and to the ends of the rubber jackets 5. Thus, secure integration of the devices 4 with the open-work band 1, 2, 3 is provided.

In service upon a tire the cross-link 1, 2, 3 is subjected to compression when it is carried into position upon the surface of the roadway and momentarily sustains the weight borne by the tire; then it is carried upward from the roadway and is subjected to tension produced by centrifugal force existing at the periphery of the rotating tire. Subject to these alternately applied forces, the loops in the plaited strands move relatively to one another, and break out such accumulations of dirt, snow, or ice that tend to lodge or freeze in the relatively large openings 8 between the loops. A comparison of Figs. V and VI will give on exaggerated scale the movement which takes place in the structure.

The cores 6 of the strands are flexible and resilient and the bodies of rubber covering such cores are of greater flexibility and resiliency. As may be observed in the drawing, the loops of the individual strands are formed on relatively great curvature, and so far as may be extend or lie in the common plane of the band. Such physical characteristics are important to the ends in view, and distinguish my structure from cross-links of twisted wire or braided fibre.

The strength and wear-resisting properties of my structure have been found superior in tests I have made on the road. The relatively flat structure of the looped and braided strands affords a maximum effective area of engagement with the roadway for a given weight of material used in construction of the device. The structure is of light weight, whereby in service impact with the roadway is reduced, this factor tending to reduce wear. Thus, by a specific refinement in structure I achieve results of substantial value.

It will be understood that many variations and modifications may be made in the means for securing my cross-link to the usual side chains without departing from the invention defined in the appended claims.

I claim as my invention:

1. A cross-link for anti-skid chains comprising a plurality of individual rubber strands reenforced with metal of substantial tensile strength and flexibility, said individual strands being looped and plaited into a relatively flat band of open-work structure in which the loops are relatively movable in service for breaking out accumulations of snow and ice, as described, and fastening means secured to the opposite ends of such band.

2. A cross-link for anti-skid chains comprising a plurality of individual rubber strands reenforced with members of relatively great tensile strength and substantial flexibility, said individual strands being looped and plaited into a relatively flat band of open-work structure in which the individual loops are relatively movable in service for breaking out accumulations of snow and ice, as described, and fastening means secured at the opposite ends of said link, said fastening means including a body of rubber vulcanized to the rubber terminals of said strands.

CHARLES W. McGINNIS.